UNITED STATES PATENT OFFICE 2,591,679

AMINOALKANOYL PHENOTHIAZINE DERIVATIVES AND THE PRODUCTION THEREOF

John W. Cusic, Skokie, Ill., assignor to G. D. Searle & Co., Skokie, Ill., a corporation of Illinois No Drawing. Application April 21, 1948,
Serial No. 22,505

13 Claims. (Cl. 260—243)

This invention relates to compounds of the phenothiazine series having in the 10-position an aminoalkanoyl radical, to salts thereof, and to processes for producing such compounds. More particularly, this invention relates to new compositions of matter having the following general structural formula

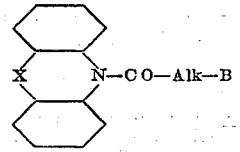

wherein X represents S, SO or $SO_2$, Alk represents a lower alkylene radical, and B represents a secondary or tertiary aliphatic-type amino radical, as well as to acid addition and quaternary ammonium salts of such bases.

The heterocyclic compounds and radicals in this aplication are named and numbered according to the rules approved by the American Chemical Society and published in "The Ring Index" by Patterson and Capell, Reinhold Publishing Corp., New York, 1940.

The compounds of the above general formula are useful as intermediates in the preparation of complex organic molecules such as pharmaceuticals. They are also of value as antioxidant, antiseptic, and surface-active agents, as well as medicinal agents such as diuretic, antihistaminic and antispasmodic drugs. It is an object of this invention to provide novel compositions of matter which are of value for the foregoing uses. It is a further object to provide simple and efficient methods for manufacturing such substances.

In the foregoing general structural formula, Alk represents lower alkylene radicals containing between 1 and 10 carbon atoms, and preferably having 1 to 3 carbon atoms between the CO and B groups. The radical Alk is a bivalent radical derived from a saturated aliphatic hydrocarbon radical, and includes such radicals as methylene, ethylene, propylene, the butylenes and amylenes, and trimethylene, tetramethylene, and polymethylene radicals containing 1 to 10 carbon atoms. The amino radical B represents an aprimary (i. e., secondary or tertiary) amino radical derived from an aliphatic or aliphatic-type amine having an ionization constant in the range of about $10^{-3}$ to $10^{-6}$, such as the lower mono- and dialkylamines and heterocyclic amines which are aliphatic in nature, including morpholine, piperidine, pyrrolidine, thiamorpholine, lupetidine, piperazine, and related cyclic amines. The alkylene radical, Alk, and the amino group, B, can be combined in a cyclic amino structure such as the 4-piperidyl, 2-imidazolinomethyl or 2-piperidylmethyl radicals. B can be derived from alkanolamines such as ethanolamine, isopropanolamine, methylethanolamine and the like, as well as esters of such amines, as for instance acetoxyethylamine. The phenothiazine nucleus of the foregoing compounds may be substituted in the benzenoid rings by halogen, alkyl or alkoxyl radicals.

N-oxides of the compounds of this invention can be obtained by oxidizing a tertiary amine of the above general formula with 30-90% hydrogen peroxide in an inert solvent such as alcohol. Such oxides are generally water-soluble crystalline substances and have the type formula

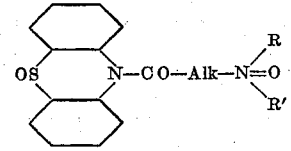

wherein R and R' represent two aliphatic radicals or together represent the elements which with N form an aliphatic-type cyclic amino radical. The oxidation usually takes place on both the nitrogen and sulfur atoms, producing an N-oxide as well as an S-oxide group.

The amino compounds which make up this invention are only slightly soluble in water, but are generally soluble in the common organic solvents. They readily form salts with acids, which salts are generally water soluble. Among the acids which are suitable for forming such salts are hydrochloric, hydrobromic, sulfuric, phosphoric, tartaric, citric, sulfamic, acetic, malic, maleic, benzoic, and similar common organic and inorganic acids which provide anions which are non-toxic in usual dosages. The 8-halogenated xanthines such as 8-chlorotheophylline, 8-bromotheophylline, and 8-chlorotheobromine are also satisfactory. Salts may also be formed by reacting the basic ketones with reactive esters of strong acids, to form quaternary ammonium salts. Such salts can be formed, for example, by reaction with esters such as methyl iodide, methyl chloride, ethyl bromide, propyl chloride, ethylene bromohydrin, propylene chlorohydrin, benzyl chloride, phenethyl bromide, dimethyl sulfate, methyl toluenesulfonate, ethyl benzenesulfonate, β-acetoxyethyl bromide, and related esters.

The compounds of this invention may be prepared by treating a compound having the following formula P—CO—Alk—X, wherein P represents a radical of the phenothiazine series, Alk is a lower alkylene radical, and X represents halogen, with a primary or second (i. e., a tertiary) aliphatic or aliphatic-type amine of the formula H—B, preferably at elevated temperature, in the presence of an inert solvent. In practice, it is preferred to use 2 to 3 moles of the amine for each mole of haloalkanoyl phenothiazine, in order that excess amine may bind the halogen acid split out during the reaction. It is preferrad to run the reaction at temperatures of the range of 50–150° centigrade for a period of several hours. At the completion of the reaction, the amine salt is removed and the solution of the aminoalkanoyl phenothiazine base in the organic solvent is isolated. The base may be obtained in a state of purity by conventional procedures such as evaporation of the solvent and distillation, or the base may be converted to the acid addition salt by treatment of the solution with an equivalent amount of acid.

My invention is disclosed in further detail by the following examples, which present specific embodiments of my invention, without, however, limiting it in spirit or in scope. The amounts of materials are given in parts by weight.

*Example 1*

112 parts of phenothiazine and 73 parts of β-chloropropionyl chloride in 550 parts of benzene are refluxed for 20 hours. The hot solution is filtered and evaporated. The residue of 10-β-chloropropionylphenothiazine is recrystallized from alcohol, and melts at 135–136° C.

150 parts of 10-β-chloropropionylphenothiazine and 85 parts of piperidine in 870 parts of dry toluene are refluxed for 6 hours. The cooled solution is extracted with dilute mineral acid, and the acid extract is made alkaline and extracted with ether. The ether extract is dried and evaporated. The residue of 10-β-piperidinopropionylphenothiazine distils at 220–230° C. at 3 millimeters pressure. It is converted to the hydrochloride by treating a dry ether solution of the base with absolute alcoholic hydrogen chloride. The hydrochloride so formed is recrystallized from isopropanol and melts at 230–205° C. The base has the formula

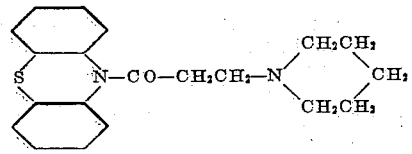

By a reaction analogous to the foregoing but employing morpholine instead of piperidine, there is formed 10-β-morpholinopropionylphenothiazine which is a viscous high-boiling oil. It has the formula

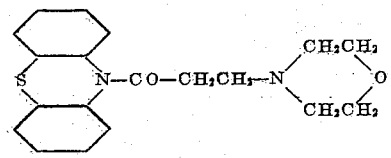

*Example 2*

29 parts of 10-β-chloropropionylphenothiazine and 12 parts of dimethylamine in 80 parts of methyl ethyl ketone containing 0.5 part of potassium iodide are heated in a closed vessel at 60–65° C. for 48 hours. The cooled reaction mixture is extracted with dilute mineral acid. The mineral acid solution is made alkaline and extracted with ether. After removal of the ether, the residue of 10-β-dimethylaminopropionylphenothiazine is crystallized from petroleum ether and melts at 86–88° C. When dissolved in ether and treated with absolute alcoholic hydrogen chloride, it forms a crystalline hydrochloride. The base has the structural formula

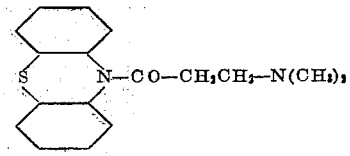

In a similar manner using 35 parts of dibutylamine in place of the dimethylamine one obtains 10-β-dibutylaminopropionylphenothiazine, which has the following structural formula

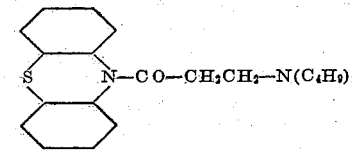

*Example 3*

15 parts of 10-β-dimethylaminopropionylphenothiazine and 5 parts of methyl chloride in 40 parts of acetone are mixed and allowed to stand at room temperature in a closed vessel. A precipitate of the quaternary salt, 10-β-dimethylaminopropionylphenothiazine methochloride, begins to form in about half an hour. After 15 hours, this is removed by filtration, washed and dried. After recrystallization from methyl ethyl ketone, it melts at about 208° C.

By a similar method using 11 parts of ethyl bromide there is produced the corresponding quaternary salt, 10-β-dimethylaminopropionylphenothiazine ethobromide.

*Example 4*

50 parts of phenothiazine and 36 parts of β-chlorobutyryl chloride in 350 parts of dry toluene are refluxed for about 15 hours. The hot solution is treated with decolorizing charcoal, filtered and evaporated. The residue of 10-β-chlorobutyrylphenothiazine is recrystallized from alcohol and melts at 158–160° C.

51 parts of 10-β-chlorobutyrylphenothiazine and 18 parts of dimethylamine in 80 parts of acetone containing 1 part of potassium iodide are heated in a closed vessel at 60° C. for 5 days. At the end of that time the solution is evaporated and the residue of 10-β-dimethylaminobutyrylphenothiazine crystallizes on standing. After recrystallization from petroleum ether, the base melts at 90–91° C. The hydrochloride is prepared by treating a dry ether-benzene solution of the base with absolute alcoholic hydrogen chloride. The 10-β-dimethylaminobutyrylphenothiazine hydrochloride is recrystallized from methyl ethyl ketone in the presence of decolorizing charcoal, and melts at 136–138° C. The base has the formula

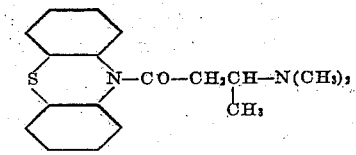

By the reaction of the same quantities of 10-γ-chlorobutyrylphenothiazine (produced from phenothiazine and γ-chlorobutyryl chloride by the above process) and dimethylamine in acetone containing a trace of potassium iodide there is formed 10-γ-dimethylaminobutyrylphenothiazine. This substance has the formula

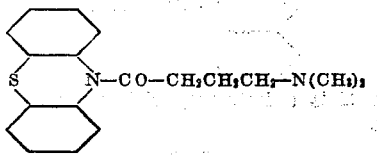

Example 5

20 parts of 10-β-dimethylaminobutyrylphenothiazine and 8 parts of methyl chloride in 60 parts of methyl ethyl ketone are heated in a closed vessel for ½ hour at 60° C. and allowed to stand for 15 hours at room temperature. The heavy precipitate of the quaternary salt, 10-β-dimethylaminobutyrylphenothiazine methochloride, is removed by filtration, dried and recrystallized from isopropanol. This salt melts at 210-212° C.

By the same procedure, using 20 parts of benzyl chloride, there is formed the corresponding quaternary salt, 10-β-dimethylaminobutyrylphenothiazine benzylchloride.

Example 6

Other compounds which are produced by the foregoing procedures include the following:

A. 10-β-isopropylaminovalerylphenothiazine

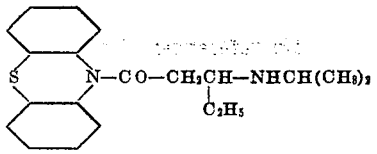

B. 10-γ-pyrrolidinobutyrylphenothiazine

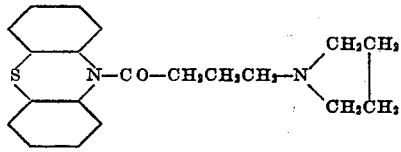

C. 10-methylethylaminoacetylphenothiazine

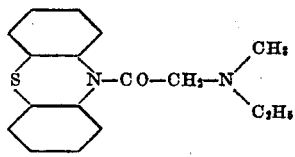

D. 10 - β - dimethylaminopropionylphenothiazine 5-monoxide N-oxide

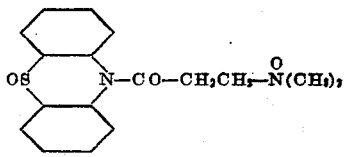

E. 10-β - dibutylaminopropionylphenothiazine 5-monoxide

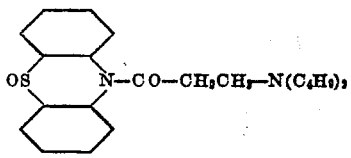

Example 7

A mixture of 58 parts of 10-β-chloropropionylphenothiazine and 40 parts of diethylamine in 120 parts of methyl ethyl ketone containing 1 part of potassium iodide is heated in a closed reactor for 5 days at 60-65° C. At the end of this period the solvent is removed and a portion of the residue of 10-β-diethylaminopropionylphenothiazine is distilled at 210-212° C. at 2 mm. pressure. It forms a crystalline hydrochloride melting at about 163-164° C.

The base has the formula

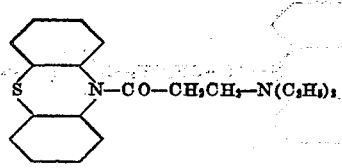

By the same method 10 parts of 10-β-chloropropionylphenothiazine are reacted with 7 parts of methylethanolamine and there is produced 10 - β - methylethanolaminopropionylphenothiazine, which has the formula

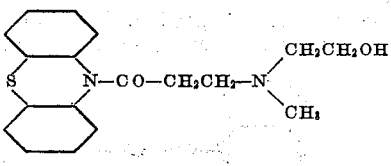

I claim:

1. A member of the group consisting of an aminoalkanoylphenothiazine derivative and salts thereof, said aminoalkanoylphenothiazine derivative having the formula Phth—CO—Alk—B wherein Phth is a member of the group consisting of 10-phenothiazine and 10-phenothiazine-5-oxide radicals, Alk is a lower alkylene radical and B is an amino radical selected from the group consisting of mono(lower alkyl)amino, di(lower alkyl)amino, 1-piperidino, 1-pyrrolidino and 4-morpholino radicals.

2. A salt of an aminoalkanoylphenothiazine of the formula

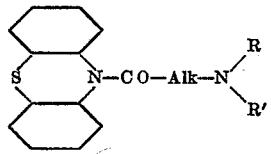

wherein Alk is a lower alkylene radical and R and R' are lower alkyl radicals.

3. A salt of an aminoalkanoylphenothiazine of the formula

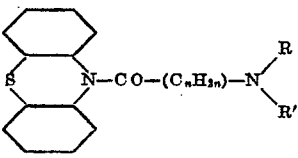

wherein $n$ is an integer greater than zero and not more than five and R and R' are lower alkyl radicals.

4. A salt of an aminopropionylphenothiazine of the formula

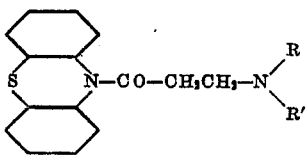

wherein R and R' are lower alkyl radicals.

5. A salt of 10-β-dialkylaminopropionylphenothiazine.

6. A salt of 10-β-dimethylaminopropionylphenothiazine.

7. 10 - β - dimethylaminopropionylphenothiazine hydrochloride.

8. A salt of an aminopropionylphenothiazine having the formula

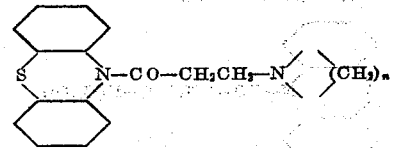

wherein $n$ is an integer greater than three and not more than five.

9. A salt of 10-β-piperidinopropionylphenothiazine.

10. 10 - β - piperidinopropionylphenothiazine hydrochloride.

11. The process of producing a salt of an aminoalkanoylphenothiazine of the formula

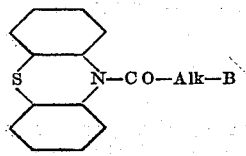

wherein Alk is a lower alkylene radical and B is an amino radical selected from the group consisting of mono(lower alkyl)amino, di(lower alkyl)amino, 1-piperidino, 1-pyrrolidino and 4-morpholino radicals, which comprises heating a compound of the formula

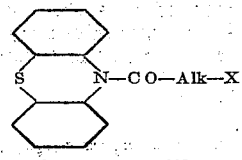

wherein X is a halogen, with an amine of the formula

H—B isolating the basic aminoalkanoylphenothiazine thus formed and converting said basic aminoalkanoylphenothiazine to a salt.

12. The process of producing a salt of a 10-β-dialkylaminopropionylphenothiazine which comprises heating a 10-β-halopropionylphenothiazine with a di(lower alkyl)amine in an inert solvent, recovering therefrom the basic phenothiazine compound, and converting said 10-β-dialkyl-aminopropionylphenothiazine to a salt.

13. The process of producing a salt of 10-β-dimethylaminopropionylphenothiazine which comprises heating 10-β-chloropropionylphenothiazine and dimethylamine in an inert solvent in the presence of a small quantity of soluble metallic iodide, recovering the 10-β-dimethylaminopropionylphenothiazine, and converting said 10-β-dimethyl-aminopropionylphenothiazine to a salt.

JOHN W. CUSIC.

No references cited.